United States Patent [19]
Richardson

[11] 4,304,616
[45] Dec. 8, 1981

[54] RADIALLY SHRINKABLE SLEEVES

[75] Inventor: Anthony R. W. Richardson, Los Altos, Calif.

[73] Assignee: Raychem Corporation, Menlo Park, Calif.

[21] Appl. No.: 26,351

[22] Filed: Apr. 2, 1979
(Under 37 CFR 1.47)

[51] Int. Cl.³ .................. B29C 27/00; B32B 31/00; H02G 15/02; B28B 11/18
[52] U.S. Cl. .................. 156/86; 174/73 R; 174/73 SC; 174/DIG. 8; 264/139; 264/162; 264/173; 264/230; 428/36
[58] Field of Search .................. 156/52, 53, 86; 174/DIG. 8, 73 R, 73 SC; 428/35, 36; 264/139, 162, 173, 230

[56] References Cited
U.S. PATENT DOCUMENTS

| | | | |
|---|---|---|---|
| 3,161,210 | 12/1964 | Loof | 156/52 |
| 3,239,396 | 3/1966 | Bohannon, Jr. | 156/52 |
| 3,612,746 | 10/1971 | Sankey | 174/73 R |
| 3,717,717 | 2/1973 | Cunningham et al. | 174/DIG. 8 |
| 3,950,604 | 4/1976 | Penneck | 174/DIG. 8 |
| 4,001,128 | 1/1977 | Penneck | 174/DIG. 1 |
| 4,035,534 | 7/1977 | Nyberg | 174/DIG. 8 |
| 4,070,746 | 1/1978 | Evans et al. | 156/344 |
| 4,092,488 | 5/1978 | Hayami et al. | 156/53 |
| 4,135,553 | 1/1979 | Evans et al. | 428/36 |

FOREIGN PATENT DOCUMENTS 2320273  11/1974  Fed. Rep. of Germany ... 174/DIG. 8

Primary Examiner—William R. Dixon, Jr.
Attorney, Agent, or Firm—Lyon & Lyon

[57] ABSTRACT

Radially shrinkable sleeves for covering joints and terminations in high voltage cables are made by radially uniform machining of an extrudate comprising an insulating layer and at least one other layer which is conductive or semi-conductive or exhibits stress control properties. Expansion of the sleeve can be effected before or after machining. Novel shrinkable sleeves which are obtainable by this method include an insulating layer which comprises at least one tapered section in which its internal diameter increases gradually from a first diameter to a second diameter.

28 Claims, 13 Drawing Figures

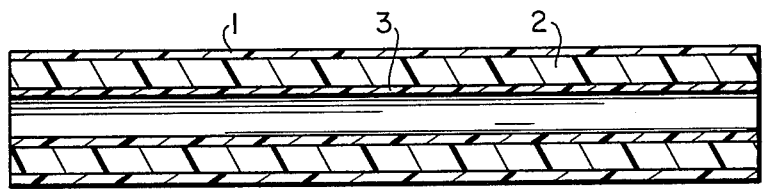
FIG_1A
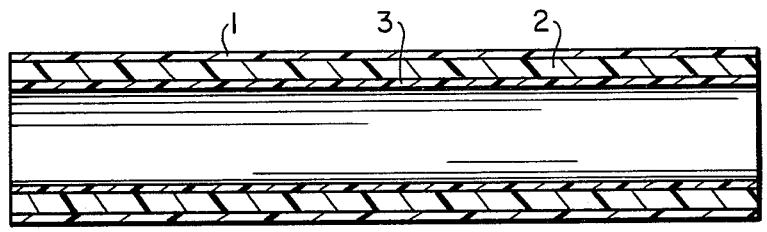
FIG_1B
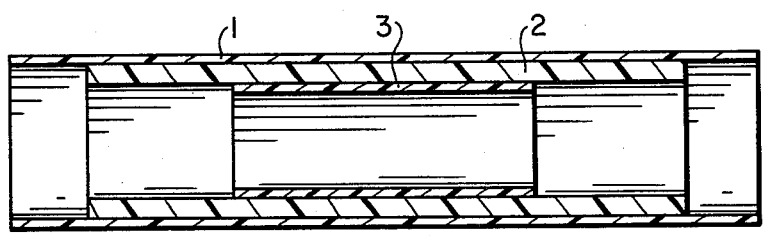
FIG_1C
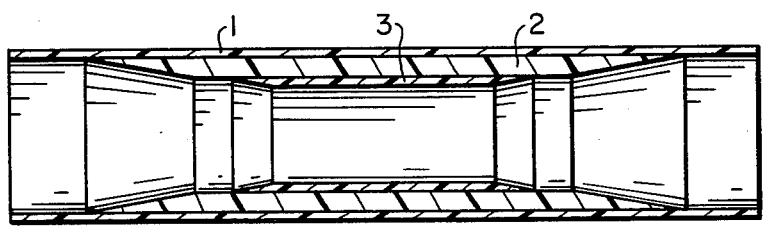
FIG_1D
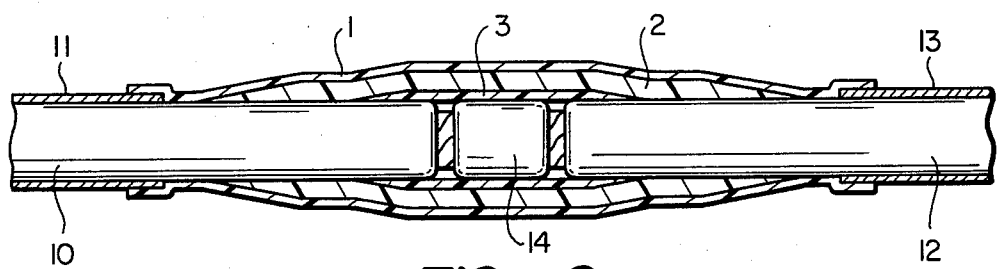
FIG_2

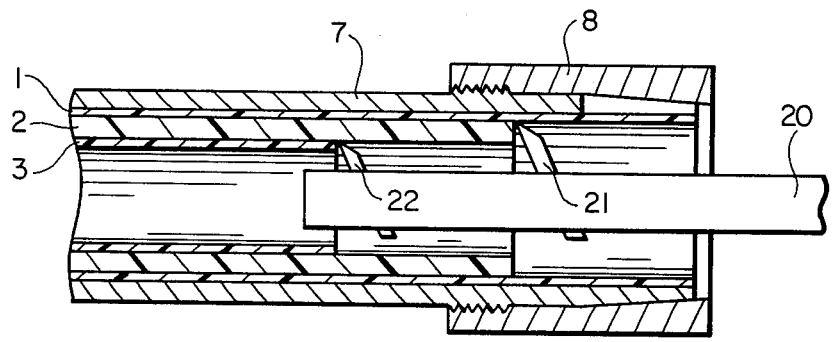
FIG_3
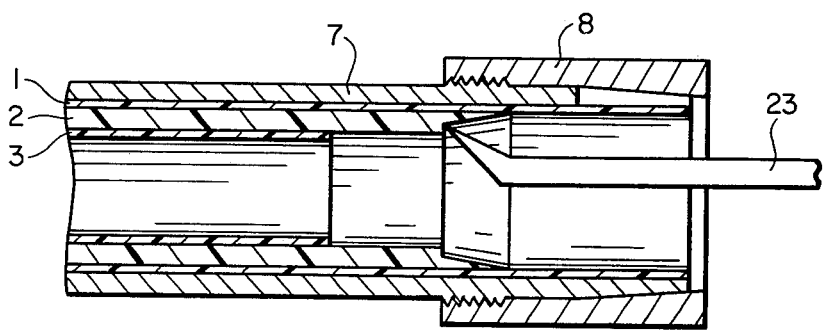
FIG_4
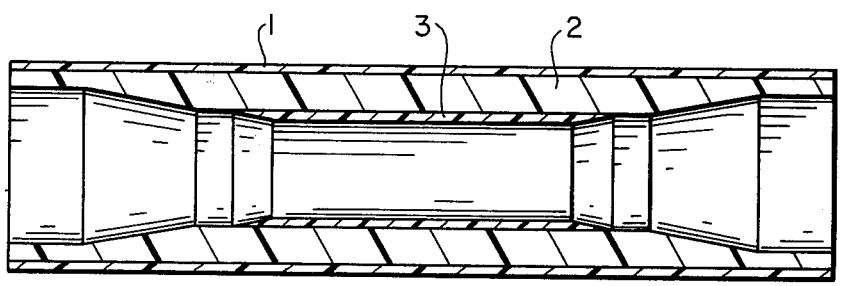
FIG_5A
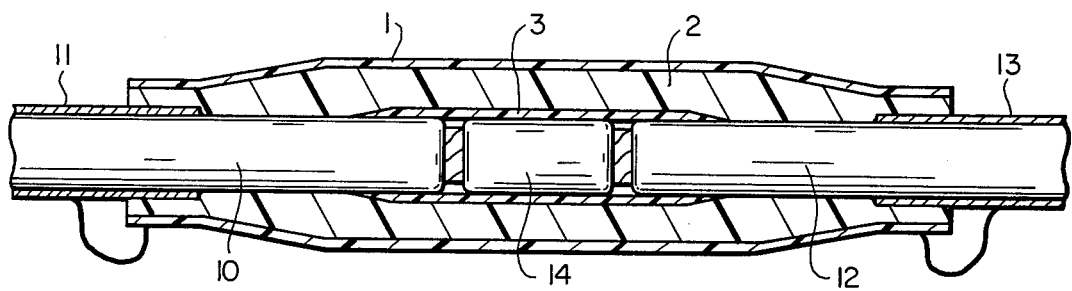
FIG_5B

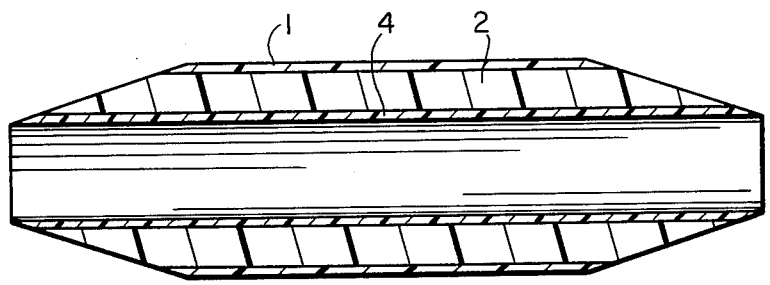
FIG._6A
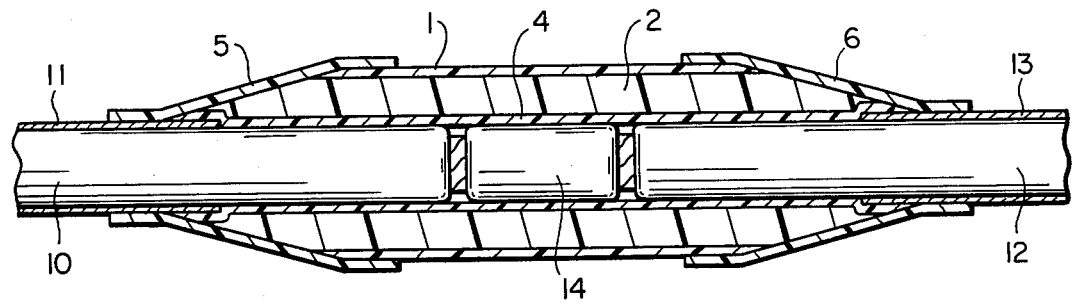
FIG._6B
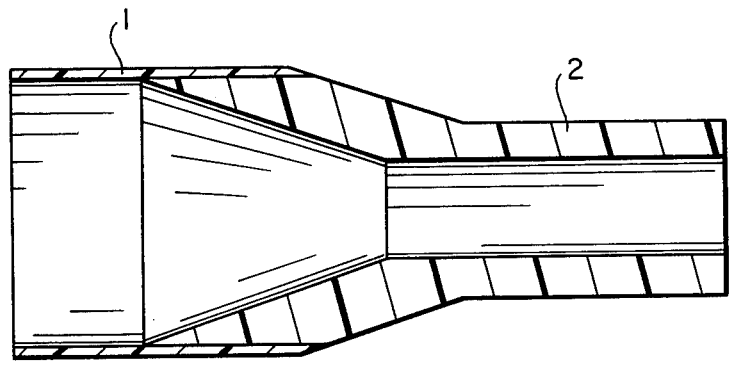
FIG._7A
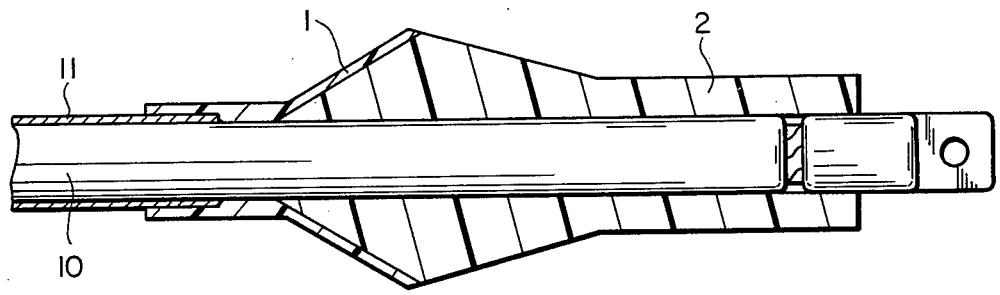
FIG._7B

RADIALLY SHRINKABLE SLEEVES

BACKGROUND OF THE INVENTION

1. Field of the Invention

This invention relates to shrinkable sleeves suitable for use in covering joints and terminations in electrical cables adapted to carry voltages of 1 KV or more.

2. Summary of the Prior Art

It is known to use shrinkable sleeves to cover joints and terminations in electrical cables adapted to carry voltages of 1 KV or more. Such sleeves generally comprise an insulating layer and either or both of (a) a conductive layer outside the insulating layer, and (b) a layer inside the insulating layer which is conductive or semi-conductive or provides electrical stress control. Reference may be made for example to U.S. Pat. Nos. 3,717,717, 3,950,604 and 4,001,128. In such sleeves, each of the layers may be independently heat-shrinkable, as for example in the sleeves described in U.S. Pat. No. 3,717,717. However, as disclosed in U.S. Pat. Nos. 4,035,534, 4,070,746 and 4,135,553 and in copending commonly assigned Application Ser. No. 586,901 by Joseph Krackeler et al., it is also possible to make shrinkable multi-layer sleeves in which at least one of the layers is a tube of elastomeric material which is maintained in the stretched condition by another layer, the other layer being heat-shrinkable, or heat-softenable, or removable. The disclosures of the U.S. Patents and application referred to above are incorporated herein by reference.

In many of the shrinkable sleeves of the prior art, the insulating layer, which is relatively thick compared to the other layer or layers, has a constant internal diameter and an outer diameter which gradually decreases at each end of the sleeve. This provides a desirable profile for the shrunken sleeve and, when there is a conductive layer outside the insulating layer, brings the conductive layer into contact with, or close proximity to, the cable shield. In sleeves which include a conductive, semi-conductive or stress control layer inside the insulating layer, many designs show this layer recessed into the central section of the insulating layer. In order to make sleeves in which the insulating sleeve is shaped, for example as described above, it has heretofore been necessary to use molding techniques which are slow and expensive.

SUMMARY OF THE INVENTION

I have now discovered an improved method of making shrinkable sleeves in which the insulating layer is shaped so that the sleeve assumes a desired profile on shrinkage. In this method, there is provided a tubular article which comprises a tubular layer of a polymeric insulating material and one or more adherent tubular layers of a polymeric composition which is conductive or semi-conductive or has stress control properties, and the article is subjected to a machining operation which removes part of the insulating layer in a radially uniform manner. The expansion of the article to its shrinkable state can be effected before or after the machining operation and, if the article is one obtained by cutting discrete lengths from an article which is longer than the desired length of the sleeve, before or after such cutting.

The method of the invention is particularly valuable when the initial tubular article is a tubular extrudate which is subsequently cut into discrete lengths, since the disadvantages of discontinuous molding techniques are thereby avoided. Preferably the extrudate comprises two tubular layers which have been produced by coextruding the desired polymeric compositions, the term "coextruding" being used to mean processes in which the polymeric compositions are simultaneously extruded through a single orifice. Methods which can be used to produce the extrudate include processes in which an extrudate of one of the compositions (or a coextrudate of two of the compositions) is first formed and then a layer of another composition is extruded (or a dual layer of two of the compositions is coextruded) on top of the first-formed extrudate or coextrudate, using a cross-head die. It is also possible for the extrudate to be produced by a method in which discrete tubular lengths of the inner layer (or a laminate of the two inner layers) are fed at regular intervals through a cross-head die and the outer layer is extruded (or the two outer layers are coextruded) around the discrete lengths; extrudates produced in this way must be cut at the appropriate points relative to the discrete lengths of the inner layer or layers.

Accordingly, in a preferred aspect, the invention provides a method of making a radially shrinkable sleeve suitable for use in covering a joint or a termination in an electrical cable adapted to carry a voltage of 1 KV or more, which method comprises (1) preparing a tubular extrudate comprising (a) a first continuous tubular layer which is composed of a first polymeric composition selected from polymeric compositions which exhibit electrical stress control properties and compositions which comprise a polymer and electrically conductive particles dispersed in said polymer in amount sufficient to render said composition conductive or semi-conductive and (b) a second continuous tubular layer composed of a second polymeric composition which is electrically insulating;

(2) cutting said tubular extrudate into discrete lengths;

(3) subjecting at least one of said discrete lengths to a machining operation in which a part of said second tubular layer is removed in a radially uniform manner; and (4) subjecting said tubular extrudate or discrete length cut therefrom to an expansion treatment which will radially expand it from a first configuration to a second expanded configuration which is storage-stable.

BRIEF DESCRIPTION OF THE DRAWINGS

The invention is illustrated in the accompanying drawings, in which

FIGS. 1A to 1D show successive stages in the production of a shrinkable sleeve of the invention;

FIG. 2 shows the shrinkable sleeve of FIG. 1D shrunk about a cable joint;

FIG. 3 shows an initial step in the machining operation;

FIG. 4 shows the final step in the machining operation; and

FIGS. 5A and 5B, 6A and 6B and 7A and 7B show other shrinkable sleeves which can be produced by the method of the invention and their respective configurations when shrunk around a joint or termination.

DETAILED DESCRIPTION OF THE INVENTION

The polymeric compositions which are referred to herein as "conductive" will generally have a resistivity of less than 1000 ohm. cm, preferably not greater than about 100 ohm. cm, and will generally be in the form of layers at least 0.02 inch thick, preferably 0.04 to 0.12 inch thick. The polymeric compositions which are referred to herein as "semi-conductive" will generally have a resistivity of $5 \times 10^7$ to $10^{10}$ ohm. cm, preferably about $5 \times 10^8$ ohm. cm, and will generally be in the form of layers at least 0.02 inch thick, preferably 0.04 to 0.08 inch thick. The polymeric compositions referred to herein as "insulating" will generally have a resistivity of at least $10^{11}$ ohm. cm, preferably at least $10^{12}$ ohm. cm and will generally be in the form of layers at least 0.15 inch thick, with greater thicknesses being preferred at greater voltages and when there is no conductive layer outside the insulating layer. The insulating compositions preferably have other advantageous properties, eg. resistance to tracking, discharge or treeing. The layer thicknesses referred to herein are the thicknesses of the layers in the tubular extrudate prior to expansion. The extrudate will generally be of constant cross-section, but by using pulsed extrusion techniques, extrudates of regularly varying cross-section can be produced, and in such cases, the thicknesses referred to are the maximum thicknesses. Suitable conductive, semi-conductive and insulating compositions and suitable compositions having electrical stress control properties are well known in the art and do not require further description here.

A wide variety of sleeves can be made by the process of the invention, both in terms of the number and type of the tubular layers and in terms of the shapes which can be produced by the machining operation and after shrinkage. When the machining operation is carried out after the expansion operation, as is generally preferred, and at least part of the machining operation is carried out internally, i.e. on the inside of the expanded discrete length, the shrinkable sleeve has a configuration which is different from its configuration after shrinkage about a cable. Thus the shrinkable sleeve has a varying internal diameter and generally a constant external diameter, whereas it shrinks about a cable to a configuration in which it has a substantially constant internal diameter and a varying external diameter. The same is also true when the machining is carried out before the expansion, and the expansion is effected in such a way that the shrinkable sleeve has a uniform external diameter, eg. by pneumatic or hydraulic expansion against a shell of uniform internal diameter. It is to be noted that such shrinkable sleeves are markedly different from the known shrinkable sleeves, which are moulded in substantially the desired final configuration, i.e. with a substantially uniform internal diameter, and are then expanded in substantially that configuration.

Accordingly the invention further provides a radially shrinkable sleeve suitable for use in covering a joint or a termination in an electrical cable adapted to carry a voltage of 1 KV or more, said sleeve comprising (a) a first tubular layer composed of a first polymeric composition selected from polymeric compositions which exhibit electrical stress control properties and compositions which comprise a polymer and electrically conductive particles dispersed in said polymer in amount sufficient to render said compositions conductive or semi-conductive, and (b) a second tubular layer composed of a second polymeric composition which is electrically insulating, said second layer comprising at least one tapered section in which its internal diameter increases gradually from a first diameter to a second diameter. The difference between the second and first diameters will usually be at least 50%, for example at least 75%, and often about 100%, of the maximum thickness of the second layer. The rate at which the internal diameter increases will generally be such that no part of the inner surface of the second layer is inclined to the axis of the sleeve at an angle greater than 30°, and preferably none is inclined at an angle greater than 20°.

Preferred sleeves of the invention comprise a first outer tubular layer which is composed of a conductive polymeric composition (and which generally provides all or part of the exterior surface of the sleeve) and a second inner tubular layer which is composed of a second insulating polymeric composition (and which generally provides at least part of the interior surface of the sleeve). Such sleeves will often also comprise a third tubular layer inside the second layer, which third layer provides a part only of the interior surface of the sleeve and is composed a third polymeric composition, which composition is conductive or semi-conductive. Such sleeves can be made from the corresponding two or three layer extrudates, the machining operation preferably resulting in the substantially complete removal of at least one portion of the second layer and/or resulting in the second layer having at least one tapered section, the taper generally being an outward taper towards the closer end of the sleeve, especially resulting in the second layer having a central section of substantially constant cross-section with an outwardly tapered section at each end thereof, the tapered sections generally being mirror images of each other. When the extrudate comprises a third tubular layer, the machining operation generally includes a step which results in substantially complete removal of at least one portion of the third tubular layer, and preferably results in the third layer having at least one tapered section, the taper usually being an outward taper towards the closer end of the sleeve, especially in the third layer having a central section of substantially constant cross-section and an outwardly tapered section at each end thereof, the tapered sections being mirror images of each other.

Expansion of the extrudate (or discrete length cut therefrom) can be effected in any way which results in a storage-stable shrinkable configuration, i.e. a configuration which is retained under normal storage conditions but which can be caused to shrink towards the original configuration. Preferably at least one of the tubular layers is cross-linked prior to expansion, eg. by irradiation, and is rendered heat-recoverable by the expansion treatment. Since it is difficult to provide satisfactory heat distribution through a relatively thick laminate in which each of the layers is heat-recoverable, it is preferred that the outer tubular layer should be rendered heat-recoverable and that the inner tubular layer or layers are composed of an elastomeric material and are maintained in a radially extended configuration by the heat-recoverable layer. The material of the inner tubular layer(s) may be rendered elastomeric by the cross-linking treatment. Suitable expansion methods are well known in the art and/or are described in the U.S. patents and application referred to above and do not require further description here. The size of the sleeve prior to expansion and the amount of the expansion must of course be selected having regard to the cable size to ensure that the expanded sleeve will fit over the cable and on shrinkage will shrink down so that the internal surface of the sleeve is in contact with the cable.

The machining of the sleeve can conveniently be effected by supporting it externally (for internal machining) or internally (for external machining) and rotating it in a lathe. A stationary boring bar with one or more single point cutting tools can be used to provide parallel-sided sections, and a single point cutting tool mounted on a lathe compound slide can be used to provide tapered sections. Such machining methods are well known and do not require further description here.

Referring now to the drawings, in each of the figures, 1 denotes a conductive polymeric member, 2 an insulating polymeric member, 3 a conductive or semiconductive polymeric member, 4 an electrical stress control polymeric member, 10 a high voltage cable comprising a shield 11, 12 a high voltage cable comprising a shield 13, and 14 a ferrule which joins the conductors of cables 10 and 12.

FIG. 1A shows a sleeve prior to expansion and machining. FIG. 1B shows the sleeve after expansion. FIG. 1C shows the sleeve after rough machining. FIG. 1D shows the final sleeve.

FIG. 2 shows the sleeve of FIG. 1D after it has been shrunk around a cable splice, the semi-conductive member 3 surrounding the splice area and the conductive member 1 contacting the cable shields.

A sleeve of the general kind shown FIG. 1D is suitable for covering a splice in a cable carrying 12 KV or more. For lower voltages, eg. about 5 KV or less, a sleeve as shown in FIG. 1D but without the inner layer 3 is satisfactory.

FIG. 3 shows the sleeve of FIG. 1B held in a collet 7 having a slotted end portion which can be constricted by rotation of clamp 8 after the sleeve has been placed in the collet. The collet is mounted in a lathe and rotated, and stationary boring bar 20 having two single point cutting tools 21 and 22 removes portions of members 2 and 3 respectively to provide the rough machined configuration shown. As shown in FIG. 4, the boring bar 20 is then replaced by a single point cutting tool mounted on the lathe compound slide, and tapers are cut in the members 2 and 3. FIG. 4 shows an intermediate stage in the cutting of the taper in the member 2. The machining operations shown in FIGS. 3 and 4 are carried out on each end of the sleeve to provide a sleeve as shown in FIG. 1D.

FIG. 5A shows a sleeve similar to that shown in FIG. 1D, but in which the insulating layer has not been completely removed at any point. FIG. 5B shows the sleeve shrunk about a cable splice. When using such a sleeve, means for electrically connecting the cable shields to the outer conductive layer must be provided.

FIG. 6A shows a sleeve which is produced by machining external tapers on an expanded sleeve comprising an inner member 4 of a polymeric composition exhibiting electrical stress control properties, a center member of an insulating composition, and an outer member of a conductive composition. FIG. 6B shows the sleeve shrunk about a cable splice, and also two auxiliary sleeves 5 and 6 which are composed of a conductive material and provide electrical connection between the cable shields and the member 1. Auxiliary sleeves 5 and 6 are put in position after the sleeve has been shrunk into place, and are conveniently heat-shrinkable sleeves of a conductive polymeric composition.

FIG. 7A shows a sleeve suitable for use in protecting a termination in a cable, as shown in FIG. 7B, insulating layer 2 being composed of a non-tracking material.

EXAMPLE

A heat-shrinkable sleeve having a configuration similar to that shown in FIG. 1D but without the inner layer 3 was prepared as follows.

A first conductive composition (polyethylene having carbon black dispersed therein, sold by Union Carbide under the trade name DHDA 7704, having a resistivity of about 100 ohm. cm) and a second insulating composition (medium density polyethylene containing a radiation crosslinking agent and an antioxidant) were coextruded into a tubular laminate having an inner diameter of about 0.4 inch and an outer diameter of about 0.8 inch. The outer layer was composed of the first conductive composition and was about 0.06 inch thick; the inner layer was composed of the second insulating composition and was about 0.14 inch thick. The extrudate was irradiated to a dosage of about 10 megarads, and a 24 inch length cut from the irradiated extrudate was then heated to about 150° C., expanded while hot until its internal diameter was about 1.11 inch, and cooled in the expanded configuration, thus rendering both layers heat-recoverable. The internal surface of the expanded tube was machined as described in connection with FIGS. 3 and 4.

The heat-shrinkable sleeve was shrunk around a joint between two solid dielectric high voltage cables for service to 5 KV and gave satisfactory results when tested to 5 KV cable specifications.

I claim:

1. A radially shrinkable sleeve suitable for use in covering a joint or a termination in an electrical cable adapted to carry a voltage of 1 KV or more, said sleeve comprising (a) a first outer tubular layer composed of a first polymeric composition selected from polymeric compositions which exhibit electrical stress control properties and compositions which comprise a polymer and electrically conductive particles dispersed in said polymer in amount sufficient to render said compositions conductive or semiconductive, and (b) a second inner tubular layer composed of a second polymeric composition which is electrically insulating, said second layer comprising at least one outwardly tapered section in which its internal diameter increases gradually from a first diameter to a second diameter such that no part of the inner surface of said second layer is inclined at an angle greater than 30° to the axis of the sleeve.

2. A sleeve according to claim 1 wherein the difference between said second and first diameters is at least 50% of the maximum thickness of said second layer.

3. A sleeve according to claim 2 wherein said difference is at least 75% of the maximum thickness of said second layer.

4. A sleeve according to claim 2 wherein said difference is 100% of the maximum thickness of said second layer.

5. A sleeve according to claim 1 wherein said first tubular layer is composed of a conductive polymeric composition and is adherent to the outer surface of said second layer such that no part of the inner surface of said second layer is inclined at an angle greater than 30° to the axis of the sleeve.

6. A sleeve according to claim 5 which comprises a third tubular layer which is adherent to the inner surface of said second layer.

7. A sleeve according to claim 6 wherein said second layer comprises a central section of substantially constant cross-section and an outwardly tapered section at each end thereof, and said third tubular layer is adherent to said central section of the second layer and also comprises a central section of substantially constant cross-section and an outwardly tapered section at each end thereof.

8. A sleeve according to claim 1 wherein said second layer comprises a central section of substantially constant cross-section and an outwardly tapered section at each end thereof, said tapered sections being mirror images of each other.

9. A sleeve according to claim 1 wherein no part of the inner surface of said second layer is inclined at an angle greater than 20° to the axis of the sleeve.

10. A method of covering a joint or a termination in an electrical cable adapted to carry a voltage of 1 KV or more, which method comprises placing around the joint or termination a shrinkable sleeve as claimed in claim 1 and causing the sleeve to shrink.

11. A method of making a radially shrinkable sleeve suitable for use in covering a joint or a termination in an electrical cable adapted to carry a voltage of 1 KV or more, which method comprises
(1) preparing a tubular extrudate comprising (a) a first continuous outer tubular layer which is composed of a first polymeric composition selected from polymeric compositions which exhibit electrical stress control properties and compositions which comprise a polymer and electrically conductive particles dispersed in said polymer in amount sufficient to render said composition conductive or semiconductive and (b) a second continuous inner tubular layer composed of a second polymeric composition which is electrically insulating;
(2) cutting said tubular extrudate into discrete lengths;
(3) subjecting a discrete length to a machining operation in which a part of said second tubular is layer is removed to provide at least one internal tapered section, the internal diameter of said tapered section increasing towards the closer end of the second tubular layer such that no part of the inner surface of said second layer is inclined at an angle greater than 30° to the axis of the sleeve; and
(4) subjecting said tubular extrudate or discrete length cut therefrom to an expansion treatment which will radially expand it from a first configuration to a second expanded configuration which is storage-stable.

12. A method according to claim 11, wherein said expansion treatment is carried out before said machining operation.

13. A method according to claim 11 wherein said tubular extrudate comprises two adjacent tubular layers which have been coextruded.

14. A method according to claim 11 wherein discrete lengths cut from said tubular extrudate are subjected to said expansion treatment after said machining operation.

15. A method according to claim 11 wherein said machining operation results in said second layer comprising a central section of substantially constant cross-section and one of said internal tapered sections at each end thereof, said tapered sections being mirror images of each other.

16. A method according to claim 11 wherein said machining operation substantially completely removes at least one portion of said second layer.

17. A method according to claim 11 which includes a step in which at least one of said first and second layers is cross-linked prior to said expansion treatment and is rendered heat-recoverable by said expansion treatment.

18. A method according to claim 17 wherein said cross-linking is effected by irradiation.

19. A method according to claim 17 wherein one of said first and second layers is cross-linked prior to said expansion treatment and is rendered heat-recoverable by said expansion treatment, and the other of said first and second layers after said cross-linking is composed of an elastomeric material and after said expansion treatment is maintained in a radially extended configuration by said layer which has been rendered heat-recoverable.

20. A method according to claim 11 wherein said tubular extrudate comprises a first outer tubular layer which is composed of a conductive polymeric composition and a second inner tubular layer which is composed of said second insulating polymeric composition.

21. A method according to claim 20 wherein said first and second tubular layers are coextruded.

22. A method according to claim 20 wherein said first tubular layer provides the exterior surface of said shrinkable sleeve.

23. A method according to claim 20 wherein said second tubular layer provides at least a part of the interior surface of said shrinkable sleeve.

24. A method according to claim 20 wherein said tubular extrudate comprises a first tubular layer which is composed of said first conductive polymeric composition, a second tubular layer which is composed of said second insulating polymeric composition and which is adherent to the inner surface of said first tubular layer, and a third tubular layer which is adherent to the inner surface of said second tubular layer and is composed of a third polymeric composition selected from conductive and semi-conductive compositions.

25. A method according to claim 24 wherein said machining operation substantially completely removes at least one portion of said third tubular layer.

26. A method according to claim 25 wherein said machining operation results in said third layer comprising a central section of substantially constant cross-section and one of said internally tapered sections at each end thereof, said tapered sections being mirror images of each other.

27. A method according to claim 24 wherein said machining operation results in said third layer having at least one internal tapered section, the internal diameter of said tapered section increasing towards the closer end of the third tubular layer.

28. A method according to claim 27 wherein said machining operation substantially completely removes at least one portion of said third layer.

* * * * *